United States Patent [19]

Smith

[11] Patent Number: 5,329,721
[45] Date of Patent: Jul. 19, 1994

[54] DEPTH-ADJUSTABLE FISHING LURE

[76] Inventor: Richard D. Smith, 9250 Gale Rd., White Lake, Mich. 48386

[21] Appl. No.: 116,760

[22] Filed: Sep. 7, 1993

[51] Int. Cl.$^5$ .............................................. A01K 85/00
[52] U.S. Cl. .................................. 43/42.22; 43/42.23
[58] Field of Search ............... 43/42.22, 42.06, 43.14, 43/42.23, 42.31

[56] References Cited

U.S. PATENT DOCUMENTS

| | | | |
|---|---|---|---|
| 2,538,181 | 1/1951 | Yates | 43/42.22 |
| 2,546,516 | 3/1951 | Nardi | 43/42.22 |
| 3,012,359 | 12/1961 | Foster | 43/43.14 |
| 3,092,925 | 6/1963 | Ho | 43/42.06 |
| 3,505,754 | 4/1970 | Lawlor . | |
| 4,155,191 | 8/1979 | Spivey . | |
| 4,785,569 | 11/1986 | Thomas, Jr. . | |
| 5,134,799 | 8/1992 | Trnka | 43/42.22 |

FOREIGN PATENT DOCUMENTS

| | | | |
|---|---|---|---|
| 2440691 | 7/1980 | France | 43/43.14 |
| 1563973 | 4/1980 | United Kingdom | 43/42.22 |
| 2148081 | 5/1985 | United Kingdom | 43/43.14 |

*Primary Examiner*—P. Austin Bradley
*Assistant Examiner*—James Miner
*Attorney, Agent, or Firm*—Gifford, Groh, Sprinkle, Patmore and Anderson

[57] ABSTRACT

A fishing lure has a lure body and a chamber open to an interior of the lure body. An intake extends from the outside of the lure body to the chamber at a first end of the chamber. A discharge extends from the outside of the lure body to the chamber at a second end of the chamber. A plunger sealingly engages a circumference of the chamber and is connected to a stem. The stem is adjustable between a first, a second and a third position located on a tongue extending from the lure and results in the plunger being displaced within the chamber. The plunger acts to draw ballast within the intake and to discharge air through the discharge opening to adjust the operating depth of the lure.

7 Claims, 2 Drawing Sheets

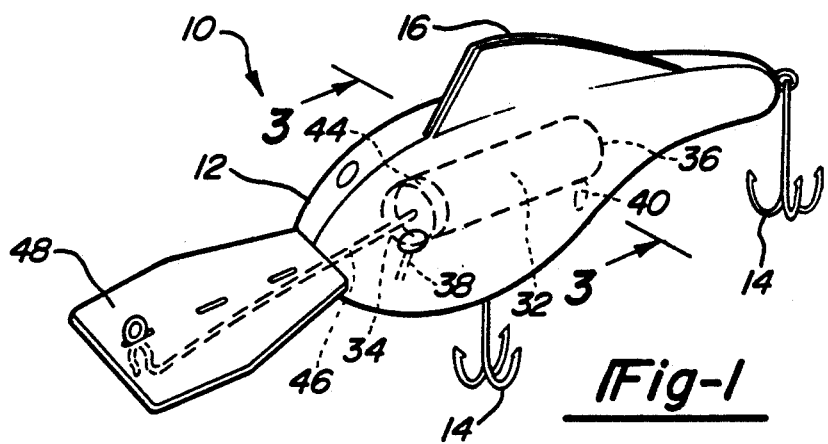
_Fig-1_
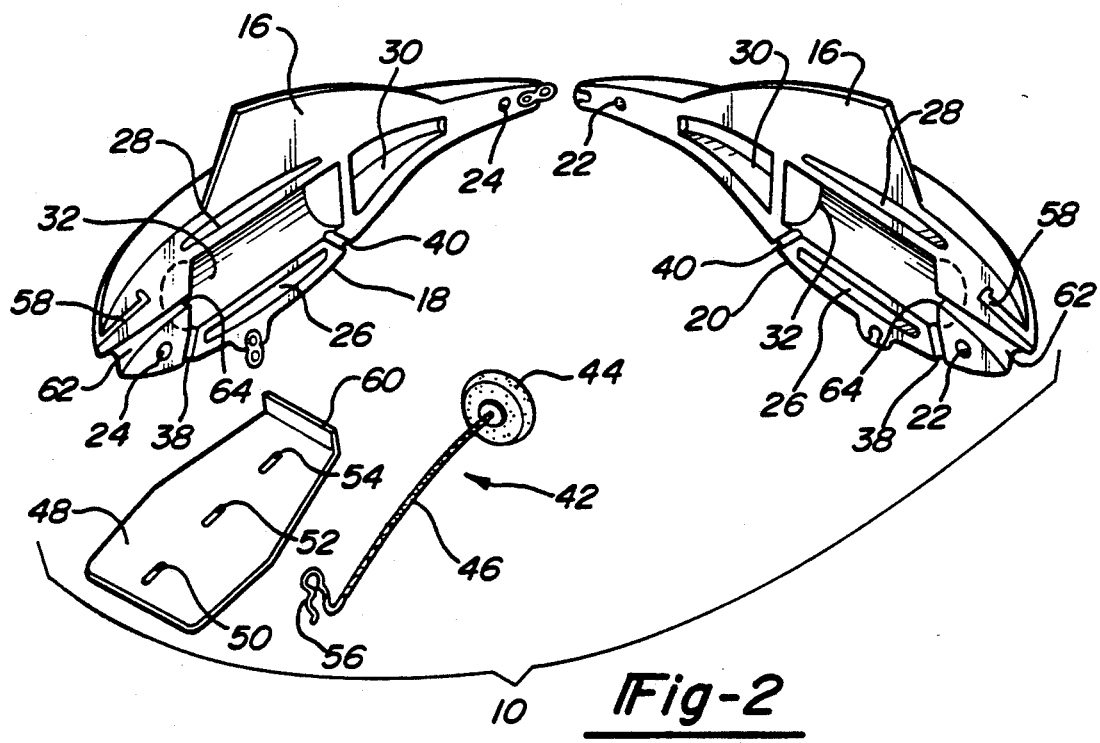
_Fig-2_
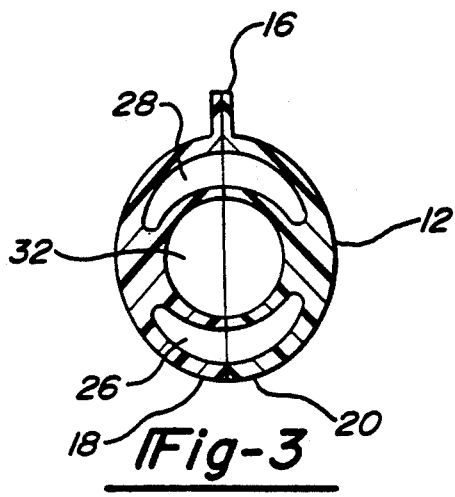
_Fig-3_

DEPTH-ADJUSTABLE FISHING LURE

BACKGROUND OF THE INVENTION

1. Field of the Invention

The present invention relates generally to fishing lures and, more particularly, to a fishing lure with built-in means for adjusting the running depth of the lure.

2. Description of the Prior Art

Fishing lures are well known in the art. Such lures can imitate the shape of minnows or other small fish. Some of these lures include means for adjusting the depth at which the lure operates. Traditionally, weights and the like have been attached to lures in an attempt to position them at a depth most conducive to catching fish.

U.S. Pat. No. 4,155,191, issued to Spivey, teaches a fishing lure with adjustable buoyancy control. Spivey has a hollow portion open to the bottom of the lure and includes a weight that is shifted by the user to make the lure a floating or a diving lure. The lip portion of Spivey is adjusted to control the depth of the dive.

U.S. Pat. No. 3,505,754, issued to Lawlor, teaches a fish lure with a body divided into front and rear hollow sections. The front and rear sections are separated by a disk element. The front section can be ballasted by adding water between the disk and the front wall. The other or both sections may receive inserts to attract game fish.

The shortcoming of the prior art patents is that they do not teach an effective means for adjusting the running depth of the fishing lure which is self-contained within the lure body and which does not require disassembly of the lure to alter the adjustment.

SUMMARY OF THE PRESENT INVENTION

The present invention is a depth adjustable fishing lure. A lure body has a chamber open to an interior of the lure body. An intake is provided at a first end of the interior chamber and a discharge is provided at the other end of the interior chamber. A plunger is located within the interior chamber and seals the circumference of the chamber to divide the chamber into first and second compartments. A stem is attached to the plunger and extends through the front of the lure body to secure to a lip extending from the front of the lure. The stem may be movable between one of three positions to adjust the position of the plunger within the interior chamber. Movement of the plunger causes water to be drawn into the interior chamber at the first end simultaneously with discharging air through the discharge at the other end. The respective amounts of water and air contained within the chamber determine the running depth of the lure.

BRIEF DESCRIPTION OF THE DRAWING

A better understanding of the present invention will be had upon reference to the following description, in comparison with attached drawing, wherein like reference numerals refer to like parts throughout the several views, and in which:

FIG. 1 is a perspective view of the fishing lure of the present invention showing the internal chamber and plunger means in phantom;

FIG. 2 is an exploded view similar to FIG. 1 and showing the fishing lure of the present invention;

FIG. 3 is a view taken along line 3—3 of FIG. 1 and showing a frontal view of the inside of the lure body of the present invention;

DESCRIPTION OF THE PREFERRED EMBODIMENT

Figure 4:
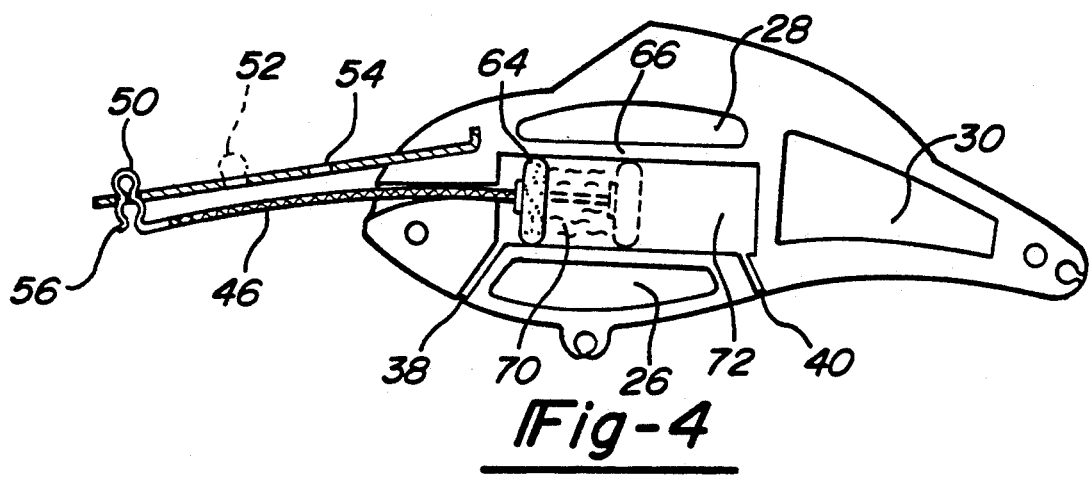
FIG. 4 is a longitudinal cut-away view of the lure body and showing the plunger means in a first and a second position.

Referring to FIG. 1 a depth adjustable fishing lure 10 has a lure body 12. The lure body is constructed from any conventional material used in existing lures and is shaped to imitate a minnow or other small fish. Depending from the lure body 12 are hooks 14 for catching game fish which may bite onto the lure body 12. The lure body 12 may further have a fin 16 for controlling its movement in the water.

Referring again to FIG. 1 and further to FIG. 2, the lure body 12 may be divided into a first half 18 and a second half 20. The first and second halves 18 and 20 may be sealingly assembled by snappingly engaging projections 22 on half 20 within apertures 24 on half 18. Upon assembly, the halves 18 and 20 form a first compartment 26, a second compartment 28 and a third compartment 30. The function of the compartments 26–30 will be described hereinafter.

Referring again to FIGS. 1 and 2, and further to FIG. 3, an interior chamber 32 open to an inside of the lure is created upon assembly of the lure halves 18 and 20. The interior chamber 32 is generally cylindrical and has a first end 34 and a second end 36. An intake 38 extends from the outside of the lure to the first end 34 of the chamber 32. An exhaust also extends from the outside of the lure to the second end 36 of the chamber 32.

Referring again to FIG. 2, a plunger assembly 42 is shown and is made up by a plunger 44 and a stem 46. The stem 46 connects to the plunge 44 at one end and secures to a tongue 48 at the other end. The plunger 44 is located within the interior chamber 32 and sealingly engages the circumference of the chamber. The tongue 48 extends at an angle with respect to the lure body 12 and is of a type which is conventionally known. The tongue 48 provides a series of slots which define a first position 50, a second position 52 and a third position 54 for receiving a free end 56 of the stem 46. The free end 56 of the stem is in the form of a resilient clip which snappingly engages within one of the slots 50–54 to position the plunger 44 within the interior chamber 32. A channel 58 is formed in the lure body and receives a lip 60 of the tongue 48 so as to mount the tongue 48 to the lure body. An outwardly flared channel 62 is also formed in the lure body at a point beneath the channel 58 and connects the stem 46 to the plunger 44 within the interior chamber 32. The diameter of an inner end 64 of the channel 62 is such that is sealingly engages around the stem 46 and prevents water from entering the chamber 32 when submerged. The outward flare of the channel 62 permits the stem 46 to flex when it is positioned between the slots 50–54.

Figure 5:
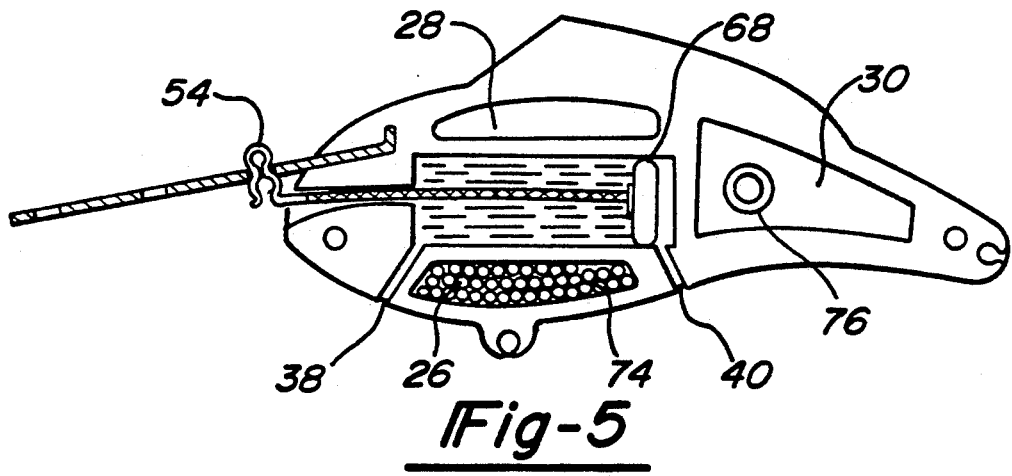
FIG. 5 is a view similar to that shown in FIG. 4 and showing the plunger means in a third position.

Referring to FIGS. 4 and 5, the function of the depth adjustable fishing lure will now be described. In a first position 64, the plunger 44 is in an abutting contact with the first end 34 of the interior chamber 32 and the free end 56 of the stem 46 is inserted within the first position slot 50. The fishing lure 10 is a shallow running lure when in this position, due to the absence of any ballast such as water and because the interior chamber 32 is filled with air.

The free end 56 of the stem 46 is removed from the slot 50 and is moved to the slot 52 when it is desired to adjust the lure so that it will operate at an increased depth within the water. As a result of the movement of the stem, the plunger 44 translates within the chamber 32 from the first position 64 to a second position 66. As the plunger moves between positions 64 and 66, a portion of the air within the chamber 32 is discharged through the discharge opening 40 formed at the second end of the chamber. Simultaneously, a ballast, such as external water, is drawn into the chamber 32 through the intake 38 at the first end 34 of the chamber. The reduction of air and the introduction of ballast within the chamber results in the lure submerging to an increased depth.

Referring again to FIG. 5, a third position 68 for the plunger 44 is shown. The third position 68 results from the free end 56 of the stem being moved from either the first or second channels 50 and 52 to the third channel 54. As a result, the plunger 44 is fully translated within the chamber 32 to abut against the second end 36 of the chamber. In the third position 68, all of the air within the chamber 32 is discharged through the discharge opening 40 and the chamber is completely filled with an external ballast through the intake 38. The third position results in the lure attaining its deepest operating position within the body of water.

When the plunger 44 is located in its second position 66, the chamber 32 is divided into a first section 70 and a second section 72. The first section 70 represents the volume of the chamber 32 which is filled with a ballast while the second section 72 represents the remaining volume which is filled with air. The invention comprehends additional positions for the plunger and stem which would enable additional operating depths for the lure. The only constant is that the ballast would fill the section 70 while the remaining air would occupy the section 72.

The repositioning of the stem and plunger is preferably manually accomplished while the user holds the lure under water. This enables the water to be drawn into the intake 38 and the air to be discharged through the discharge opening 40. The lure is removed from the water and the stem is displaced from the third position 54 back to the first position 50 when it is desired to empty the ballast from the lure through the intake 38.

Referring again to FIGS. 2, 4 and 5, the chambers 26, 28 and 30 can be filled with metal beads, such as those shown at 74 in FIG. 5. This additional ballast is used in combination with the plunger and stem arrangement when it is desired to incrementally reset the first, second and third operating depths of the lure. The chambers 26–30 may further contain a rattling device 76 for attracting a game fish.

The fishing lure as described above is particularly useful when employed with a conventional depth finder for determining at what depth the desired fish are located. The lure can then be adjusted to operate at that depth to attract the game fish. The lure of the present invention is also novel over all other conventional lures in that the means for adjusting the depth of the lure is entirely incorporated within the lure body and requires no disassembly, except as is desired for inserting additional ballast 74 or a rattling device 76.

Having described my invention, additional embodiments will become apparent to those skilled in the art to which the invention pertains.

I claim:

1. A fishing lure, comprising:
   a lure body;
   a hook attached to said lure body;
   an interior chamber formed within an interior of said lure body;
   an intake at a first end of said interior chamber;
   a discharge at the other end of said interior chamber;
   a plunger means for drawing water through said intake and for discharging air through said discharge to select an operating depth for said fishing lure, said plunger means comprises a plunger which sealingly engages around a circumference of said interior chamber to divide said interior chamber into a first section and a second section;
   means for adjusting a position of said plunger within said interior chamber, said means comprising a stem, said stem being selectively positioned at a first end along a tongue protruding from said fishing lure, said stem connecting to said plunger at the other end; and
   said tongue having a first, a second and a third position for receiving said stem, said plunger being positioned within said interior chamber according to said position at said tongue to which said stem is engaged.

2. The fishing lure as described in claim 1, further comprising at least one hook attached to said fishing lure.

3. The fishing lure as described in claim 1, wherein said lure body is divided longitudinally into a first half and a second half, said first and second halves having means for sealingly engaging said first and second halves together.

4. The fishing lure as described in claim 3, further comprising at least one enclosure within said lure body, said enclosure being accessible by the separation of said first and second halves, said enclosure receiving a ballast to influence the depth of said fishing lure.

5. The fishing lure as described in claim 4, wherein said at least one enclosure receives a rattling device.

6. A fishing lure, comprising:
   a lure body divided longitudinally into a first half and a second half, said first half and said second half being sealingly engaged together;
   a hook attached to said lure body;
   an interior chamber formed within an interior of said lure body upon the engagement of said first and second halves, said chamber having a first end and an other end which defines a substantially cylindrical shape having a circumference;
   an intake line communicating the exterior of said lure body with said first end of said interior chamber;
   a discharge line communicating the exterior of said lure body with said other end of said interior chamber;
   a plunger which is sealingly engaged around said circumference of said interior chamber and divides said interior chamber into a first section and a second section; and
   a stem which is connected to said plunger, said stem extending beyond said lure body and actuating said plunger to draw water through said intake into said first section and to release air from said second section through said discharge to select an operating depth for said fishing lure.

7. A fishing lure, comprising:

a lure body;

a hook attached to said lure body;

an interior chamber formed within to an interior of said lure body, said chamber having a first end and an other end;

an intake at said first end of said interior chamber;

a discharge at said other end of said interior chamber;

a plunger sealingly engaged around a circumference of said interior chamber to divide said interior chamber into a first section and a second section;

a tongue protruding from said fishing lure, said tongue defining a surface having at least two slots formed therein; and a stem connected to said plunger at a first end and secured within a slot of said tongue at an other end;

wherein said stem is adjusted along said slots of said tongue so that said plunger is actuated to draw water through said intake and to discharge air through said discharge to select an operating depth for said fishing lure.

* * * * *